Sept. 14, 1965    C. VON MÜNCHHOFEN    3,206,143
CONTROLLER FOR GUIDING A MISSILE CARRIER ON THE
LOCATION CURVE OF BALLISTIC FIRING POSITIONS
Filed Feb. 16, 1962

INVENTOR.
CASPAR VON MÜNCHHOFEN
BY
Hall, Pollock + Vande Sande
HIS ATTORNEYS

United States Patent Office 3,206,143
Patented Sept. 14, 1965

3,206,143
CONTROLLER FOR GUIDING A MISSILE CARRIER ON THE LOCATION CURVE OF BALLISTIC FIRING POSITIONS
Caspar von Munchhofen, Munich, Germany, assignor to Messerschmitt AG., Augsburg, Germany, a company of Germany
Filed Feb. 16, 1962, Ser. No. 173,689
Claims priority, application Germany, Feb. 18, 1961, M 48,073
2 Claims. (Cl. 244—14)

The invention relates to a method of guiding automatically a carrier of missiles and/or rockets—for example, an intercepting aircraft—along the line bearing at ballistic positions of fire.

Automatic systems for guiding an interceptor toward a flying target begin their operation at the moment when the target is picked up by the airborne radar. Two different methods are known: first, the guidance along the target-hunting or pursuit curve where the course of the pursuing aircraft is directed continuously in such manner that it bears at the target (possibly at a lead angle), and secondly, the guidance toward a collision course where the bearing does not deviate relative to a direction fixed in space, this point representing the final target.

For the purpose of determining and maintaining the pursuit course, the angle $\varphi$ between the line of sight and the course is measured by means of the airborne radar.

It is the task of the guidance system to control the course $\theta$ of the intercepting aircraft on the basis of value $\varphi$ in such manner that value becomes zero because the requirement that the course should be set toward the target is satisfied only if $\varphi$ becomes zero. The resultant motion of the aircraft in the form of a relative motion to the target is depicted by the airborne radar as a change of angle $\varphi$.

The collision course is determined and maintained with the aid of the airborne radar by measuring the angular velocity $$\frac{d\varphi}{dt}$$

of the line of sight, and by controlling the course by the guidance system in such manner that the value $$\frac{d\varphi}{dt}$$

becomes zero. This means that the line of sight will not turn any longer, and any change in its position will be parallel to its previous position.

In view of the fact that in case of a flight at collision course the angular course velocity $$\frac{d\theta}{dt}$$

must be influenced by the guidance system in such manner that it is proportional to the angular velocity $$\frac{d\varphi}{dt}$$

this method is also referred to as proportional navigation.

The pursuit of a moving target by means of either one of the methods described above has various disadvantages: Guidance along a pursuit curve will result in a curved flight path which at high speeds, such as Mach 2, will lead to excessively high and unrealistic accelerations. The pursuit at a collision course where target and pursuer usually move toward each other will result in such high relative speed that the accuracy of fire will be impaired.

In order to overcome these disadvantages, guidance systems have been developed where the pursuing aircraft is being guided along a flight path which is devised in such manner that realistic values are obtained for terminal relative velocity toward the target as well as for the acceleration in case of high rates of speed of the pursuing aircraft will always be in firing position relative to the target, the aircraft being at a collision course relative to missile and target. Such course is referred to as a line bearing at ballistic positions of fire.

The known guiding systems for the control of an aircraft along the above described flight path operate in the following manner: A bearing of the target is taken optically and the actual angle of lead $\varphi_i$ is determined therefrom. At the same time the target is located and fixed by radar and the desired angle of lead $\varphi_s$ is computed by feeding the values obtained into a collision-course computer. The two values $\varphi_i$ and $\varphi_s$ are depicted by appropriate indicating devices. It is the task of the pilot to navigate the aircraft in such manner that $\varphi_i$ and $\varphi_s$ coincide. In this manner the course toward the target is being stabilized with the result that the aircraft is being guided at the line bearing at ballistic firing positions.

It is very difficult for an aircraft pilot to operate this system properly and a demand exists for an automatic control system to eliminate the duplication of the taking of a bearing as required for the determination of the desired, as well as the actual, angle of lead.

The invention solves this problem of automatic guidance within the control circuit of the proportional navigation system by changing continuously the amplification factor of the time-differential of the direction of the line of sight in relation to a fixed direction in space by means of an external control circuit, depicted in FIGURE 2, by block NR and appropriate connecting lines, in such manner that the carrier, for example, the intercepting aircraft, will fly along the course of the ballistic firing positions instead of a collision course.

The invention proposes in this connection that the amplification factor $k$ is compounded from the sum of a constant value $k_1$ and a variable value $k_2 \cdot \epsilon$.

The magnitude of the proportional factor $\epsilon$ is computed continuously by a non-linear control device as a function of the angle between course and line of sight, the time-differential of said angle, the distance of the carrier—for example, the intercepting aircraft—from the target, the present speed of the carrier, and the ground absolute speed of the missile based on the equation $$\epsilon = \frac{d\varphi}{dt} \cdot s + f(w, v) \cdot \sin \varphi$$

According to the invention, the proportional factor $k$ will be zero at the flight along the line bearing at ballistic firing positions, it will have a positive value if the angle of lead of the course of the carrier $\varphi_b$ is greater than the target angle of lead $\varphi$, and a negative value if the angle of lead of the course of the carrier $\varphi_c$ is less than the target angle of lead $\varphi$.

Details of the method proposed by the invention are disclosed by the description of one species of the automatic guidance system based on the drawings.

In order to guide the interceptor—in case of the species illustrated a pursuing and firing aircraft provided with rockets having a propulsion power plant (sustainer)— along the line bearing at ballistic firing positions by use of the automatic guidance system $A_{ST}$, illustrated in FIG- URE 2, it is necessary to determine the following values with the aid of the radar installation R (see FIGURE 1):

The distance $s$ between carrier T and target Z;

The direction $\varphi$ of the line of sight relative to a fixed position $B_r$ in space;

The time-differential $$\frac{d\varphi}{dt}$$

of the direction of the line of sight;

The angle $\varphi$ between the line of sight and the direction of the course; and The time-differential $$\frac{d\varphi}{dt}$$

of the angle $\varphi$.

The fixed direction of reference $B_r$ is obtained by a stabilized gyro surface. The foregoing values can be obtained by known airborne radar apparatus of the type which, in aircraft whose axis is continuously directed at a target, continuously measures the angle between the aircraft axis and the target and also determines the distance between the aircraft and the target. Such radar apparatus also measures the angle between the line of sight (interceptor-to-target) and a fixed spatial bearing established by a gyro platform.

Figure 2:
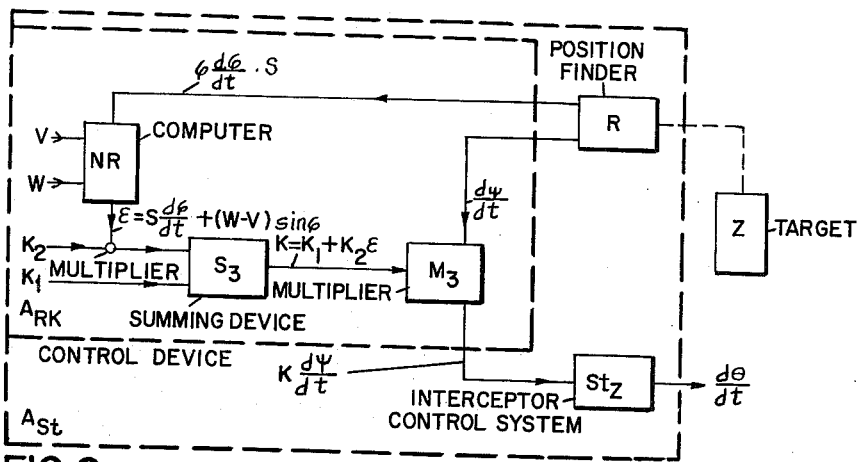
FIGURE 2 illustrates the block circuit diagram of an automatic guidance system.

The values determined by radar position fixing are transmitted over two channels of the external control circuit $A_{RK}$, as shown by FIGURE 2, to the guidance system of the interceptor. The radar position finder apparatus R furnishes the time differential $$\frac{d\psi}{dt}$$

of the line of sight angle, and this is multiplied by the factor $k$ in the multiplier M. The resulting value $$k \cdot \frac{d\psi}{dt}$$

equals the proportional angular course velocity $$\frac{d\theta}{dt}$$

of the interceptor. The expression $$k \cdot \frac{d\psi}{dt}$$

represents the value to be obtained by the control device, i.e. the control value for $St_z$, and $$\frac{d\theta}{dt}$$

is the result of the controlling operation. This is the control circuit of the known proportional navigation.

The invention extends this control circuit by the additional circuit branch including non-linear control device NR, and summing amplifier $S_3$. This branch is designed to change the amplification factor $k$ continuously in conformity with the guidance and control values in such manner that the interceptor will fly along the line bearing at ballistic firing positions and not in the direction of a collision course. The non-linear control device NR computes from the guidance and control values $$\varphi, \frac{d\varphi}{dt}, s$$

interceptor speed $v$ and missile speed $w$ the proportional factor $\epsilon$ based on the formula $$\epsilon = \frac{d\varphi}{dt} \cdot s + f(w, v) \sin \varphi$$

where $f(w, v)$ represents the mean relative velocity of interceptor and missile speed. In case of the rocket with a propulsion power plant (sustainer) employed in the species illustrated $f(w, v)$ becomes $w-v$ in the first approximation. The summing device $S_3$ forms from the proportional factor $\epsilon$ and the constant guidance values $k_1$ and $k_2$ the amplification factor $k$. It is this amplification factor $k$ which is used by the inner control circuit of the proportional navigation system to hold the interceptor on course.

Figure 1:
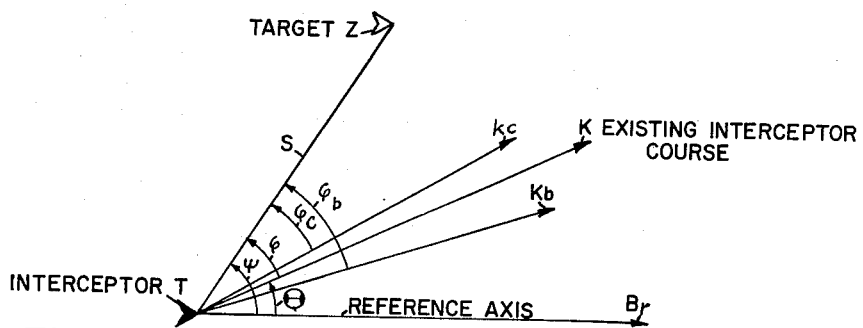
FIGURE 1 illustrates the correlation of the lines of course and sight into one fixed direction of reference.

It is a special feature of the guidance system that it is not necessary to perform an airborne computation of the desired direction when setting course toward the target because the device solely uses value $\epsilon$ as criterion whether or not the course toward the target is being maintained. This is accomplished by the continuous computation of the value by the non-linear control device NR based on the continuously measured values. It is the characteristic of this value that it becomes zero at the moment when the interceptor is in firing position relative to the target (zero-point control). If the value $\epsilon$ is positive the angle of lead of the interceptor $\varphi_b$ is greater than the target angle of lead $\varphi$ for the course $k_b$; correspondingly, in case of a negative $\epsilon$-value the angle of lead of the course of the interceptor $\varphi_c$ is less than the target angle of lead $\varphi$ for the course $k_c$ (FIGURE 1). Reference is made to FIGURE 1 which shows two examples of aircraft deviations ($k_c$ and $k_b$) from the desired course $k$. In the first example, the interceptor is off-course as indicated by $k_b$ and the error-signal $\epsilon$ becomes positive in accordance with the design of the control device. It becomes positive because the course must be corrected by a left turn relative to the desired course $k$. In the other example shown by FIGURE 1, the off-course of the interceptor is indicated by $k_c$. In this case the $\epsilon$ value becomes negative because the course $k_c$ must be corrected by a right turn relative to the desired course $k$.

Any deviation of $\epsilon$ from the zero-value is transmitted by the summing amplifier $S_3$ to the multiplication device $M_3$ and will influence the guidance system of the interceptor $St_z$ in such manner that the interceptor will approach the target always in firing position.

Obviously, the guidance system will return the interceptor to the correct course also in the event that the target moves out from the firing position by use of evasive action.

Figure 3:
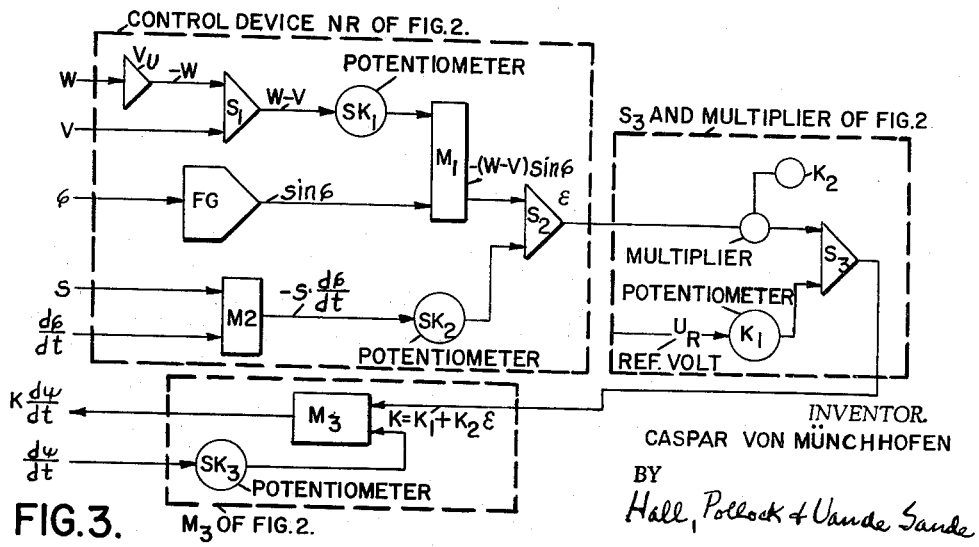
FIGURE 3 illustrates a circuit for the external control circuit.

FIGURE 3 illustrates a species of the external control system $A_{RK}$ of the FIGURE 2 for a rocket either launched or guided at a collision course. In the summing device $S_1$ of the computer which employs a reference voltage of $-U_R$ volt (for example, 100 v.) the missile velocity $w$ is added, upon inversion of the sign, in the inversing amplifier $V_u$ to the present speed $v$ of the interceptor. The sum $w-v$ is transmitted to a multiplying device $M_1$ and multiplied thereby the sine of angle $\varphi$ formed by the line of sight and the direction of course, a value which is being obtained in the integral generator FG.

The value of the product $(w-v) \cdot \sin \varphi$ is scaled by means of potentiometer $SK_1$ and added with the correct sign, upon inversion of the sign, in the summing device $S_2$ to the product $$s \cdot \frac{d\varphi}{dt}$$

which has been scaled by the potentiometer $SK_2$ and obtained by use of the multiplication device $M_2$ from the distance $s$ and the differential of angle $\varphi$. The sum represents the value of the proportional factor; it is scaled with a constant $k_2$ (for example: $-.4 < k_2 < -.05$), added in the summing device $S_3$ to a constant $k_1$ (for example: $1 < k_1 \leqslant 1.2$), the end product being the amplification factor $k$. This factor $k$ is multiplied by the time-differential of angle $\psi$ in the multiplying device $M_3$, scaled by the potentiometer $SK_3$, and obtained thereby is the proportional angular velocity $$k \cdot \frac{d\psi}{dt}$$

This value is used to control, by known methods, i.e. proportional navigation, the interceptor through the inner circuit of the guidance system.

The guidance of the interceptor along the flight path of the pursuing and firing aircraft along with the correct firing position is always maintained by mixing signals of the external control circuit $A_{RK}$ with the automatic guidance system $A_{ST}$ as shown by FIGURE 2 is based on the premise that the direction of course of the interceptor is pointed initially between the direction of line of sight and direction of collision course.

Obviously, it is also possible to design the automatic guidance system proposed by the invention in the form of a semi-automatic guidance system. For example, the $\epsilon$-zero balancing in the non-linear control device NR could be accomplished by the pilot.

I claim:

1. A method for guiding a missile carrying interceptor along a course of ballistic firing positions with respect to a target comprising the steps of, generating a first signal having a value proportional to the angle $\varphi$ between the course of said interceptor and the line-of-sight from said interceptor to said target, generating a second signal having a value proportional to the angle $\psi$ between said line-of-sight and a fixed bearing in space, generating a third signal having a value proportional to the distance $s$ between said interceptor and said target, generating a fourth signal having a value proportional to the velocity $v$ of said interceptor, generating a fifth signal having a value proportionnal to the velocity $w$ of said missile generating a sixth signal proportional in value to $$k \cdot \frac{d\psi}{dt}$$

where $k = k_1 + k_2 \epsilon$, where $$\epsilon = \frac{d\psi}{dt} \cdot s + f(w, v) \cdot \sin \varphi$$

where $-.4 < k_2 < .05$, and where $1 < k_1 \leq 1.2$, and controlling the course of the interceptor in response to the value of said sixth signal.

2. The method of claim 1 wherein said sixth signal is proportional in value to $$k \cdot \frac{d\psi}{dt}$$

where $k = k_1 + k_2 \epsilon$ and where $$\epsilon = \frac{d\psi}{dt} \cdot s + (w - v) \cdot \sin \varphi$$

References Cited by the Examiner

UNITED STATES PATENTS

| | | | |
|---|---|---|---|
| 2,992,423 | 7/61 | Floyd et al. | 244—14 X |
| 3,081,050 | 3/63 | Lapham et al. | 244—14 |
| 3,083,666 | 4/63 | Agins | 244—14 X |

BENJAMIN A. BORCHELT, *Primary Examiner.*

SAMUEL FEINBERG, CHESTER L. JUSTUS,
*Examiners.*